(12) United States Patent
Fernandez Orive et al.

(10) Patent No.: US 11,001,003 B2
(45) Date of Patent: May 11, 2021

(54) METHOD AND SYSTEM FOR UNPACKING OBJECTS

(71) Applicant: LORAMENDI, S. COOP., Vitoria-Gasteiz (ES)

(72) Inventors: Luis Alfonso Fernandez Orive, Vitoria-Gasteiz (ES); Alesander Olea Abarrategi, Igorre (ES)

(73) Assignee: LORAMENDI, S. COOP., Vitoria-Gasteiz (ES)

( * ) Notice: Subject to any disclaimer, the term of this patent is extended or adjusted under 35 U.S.C. 154(b) by 159 days.

(21) Appl. No.: 16/447,287

(22) Filed: Jun. 20, 2019

(65) Prior Publication Data

US 2019/0299534 A1 Oct. 3, 2019

Related U.S. Application Data

(63) Continuation of application No. PCT/ES2018/070102, filed on Feb. 13, 2018.

(30) Foreign Application Priority Data

Feb. 23, 2017 (EP) ..................................... 17382090

(51) Int. Cl.
*B29C 64/35* (2017.01)
*B33Y 40/00* (2020.01)
(Continued)

(52) U.S. Cl.
CPC ............ *B29C 64/35* (2017.08); *B29C 64/357* (2017.08); *B29C 64/379* (2017.08); *B33Y 40/00* (2014.12)

(58) Field of Classification Search
CPC ............................... B29C 64/35; B29C 64/357
See application file for complete search history.

(56) References Cited

U.S. PATENT DOCUMENTS 5,437,820 A * 8/1995 Brotz ...................... B29C 35/10
264/497
5,658,412 A * 8/1997 Retallick ................. B22F 10/20
156/272.8
(Continued)

FOREIGN PATENT DOCUMENTS

CN          2522196 Y      11/2002
CN        205130409 U       4/2016
(Continued)

OTHER PUBLICATIONS

Extended European Search Report in corresponding European Application No. 17382090.3, dated Aug. 16, 2017, 7 pages.
(Continued)

*Primary Examiner* — Timothy Kennedy
(74) *Attorney, Agent, or Firm* — Edell, Shapiro & Finnan, LLC

(57) ABSTRACT

Method and system for unpacking objects produced by means of additive manufacturing from a granular material in a job box. The objects are unpacked from a non-solidified granular material by means of the method once they are produced, starting from the arrangement of said objects and said granular material on a platform of the box. The platform includes holes to discharge the granular material, said holes being opened in a controlled manner for said discharge and for separating the objects from the granular material, the objects being unpacked. To perform the unpacking, a controlled inclination of the box in different directions is caused, with the holes of the platform being open, for shifting the granular material around and making the discharge thereof through said holes easier.

18 Claims, 3 Drawing Sheets

(51) Int. Cl.
*B29C 64/379* (2017.01)
*B29C 64/357* (2017.01)

(56) References Cited

U.S. PATENT DOCUMENTS

| | | | | |
|---|---|---|---|---|
| 2001/0045678 | A1* | 11/2001 | Kubo | B29C 64/35 |
| | | | | 264/37.29 |
| 2002/0090410 | A1* | 7/2002 | Tochimoto | B29C 64/321 |
| | | | | 425/215 |
| 2004/0084814 | A1* | 5/2004 | Boyd | B33Y 40/00 |
| | | | | 264/497 |
| 2005/0001356 | A1* | 1/2005 | Tochimoto | B29C 64/165 |
| | | | | 264/308 |
| 2007/0001342 | A1* | 1/2007 | Oberhofer | B33Y 10/00 |
| | | | | 264/237 |
| 2008/0006334 | A1* | 1/2008 | Davidson | B33Y 30/00 |
| | | | | 137/571 |
| 2008/0241404 | A1* | 10/2008 | Allaman | B29C 64/165 |
| | | | | 427/333 |
| 2013/0241095 | A1* | 9/2013 | Korten | A61C 13/0022 |
| | | | | 264/16 |
| 2015/0056321 | A1* | 2/2015 | Zhang | B29C 64/35 |
| | | | | 425/225 |
| 2015/0258744 | A1* | 9/2015 | Muller | B29C 64/165 |
| | | | | 264/37.29 |
| 2017/0246808 | A1* | 8/2017 | Hochsmann | B29C 64/165 |
| 2018/0193887 | A1* | 7/2018 | Pourcher | B33Y 40/00 |
| 2018/0236504 | A1* | 8/2018 | Pourcher | B29C 64/35 |
| 2019/0193148 | A1* | 6/2019 | Kiener | B29C 64/153 |

FOREIGN PATENT DOCUMENTS

| | | |
|---|---|---|
| CN | 205816336 U | 12/2016 |
| WO | 2007139938 A2 | 12/2007 |
| WO | 2015071184 A1 | 5/2015 |
| WO | 2017017273 A1 | 2/2017 |

OTHER PUBLICATIONS

International Search Report and Written Opinion in corresponding International Application No. PCT/ES2018/070102, dated May 17, 2018, 14 pages.

* cited by examiner

METHOD AND SYSTEM FOR UNPACKING OBJECTS

CROSS-REFERENCE TO RELATED APPLICATIONS

This application relates to and claims the benefit and priority to International Appl. No. PCT/ES2018/070102, filed Feb. 13, 2018, which relates to and claims the benefit and priority to European Application No. EP17382090.3, filed Feb. 23, 2017.

TECHNICAL FIELD

The present invention relates to methods and systems for unpacking objects, and more specifically to methods and systems for unpacking objects produced by means of additive manufacturing, in which the produced objects are packed with non-solidified granular material.

BACKGROUND

Sand cores are generally made in conventional sand making machines where a mold defines the shape of the core to be made in each making cycle (or of the cores to be made). The material used for making the cores is then poured into the mold, and said material is hardened or cured to render the result solid. Said result is the sand core. The material used is a granular material (a type of sand) mixed with at least one additive or binder (a type of resin, for example).

In recent years, use of another sand core making methods has been implemented: additive manufacturing or 3D manufacturing. In additive manufacturing, the objects (cores) are produced from a granular material and an additive solidifying the sand. The sand and the additive are arranged in layers in a job box, on a platform of the job box, the additive layers being applied only on the granular material of interest (and depending on the shape of the object to be produced). At the end of the process, the produced objects and solidified by means of the additive, as well as the granular material that has not been impregnated with the additive (non-solidified granular material) remain in the job box. It is therefore necessary to separate the objects from said non-solidified granular material, i.e., it is necessary to unpack the objects.

Although the objects thus produced are in solid state, they are generally fragile and it is often impossible to handle them with robots in order to separate them from the non-solidified granular material since the risk of breaking them is high. It is therefore necessary to use other less aggressive methods for unpacking them. One known method is to use platforms for the job box with holes that can be opened in a controlled manner such that upon opening them, the non-solidified granular material present in said job box is discharged through said holes by gravity.

A problem in systems of this type is that not all the non-solidified granular material is left facing the holes, so it is often impossible to discharge said material, or at least the required part, through said holes. To solve this problem, patent document US2015/0258744A1 describes a system in which additional holes are incorporated in the platform and a fluid is introduced from below and through said holes for generating a fluidized bed of the non-solidified granular material present in the job box. This requires at least using additional injection nozzles and filters, and furthermore, this solution does not assure that the fluid will be able to reach all of the non-solidified granular material, particularly the material arranged on the objects and/or in the upper part of the work chamber.

Patent document WO2007/139938A2 discloses a method and apparatus for handling powder in a 3D printer. The apparatus includes a means of transporting powder from multiple sources to a powder dispensing apparatus, and a vibration mechanism to cause a vibration to assist in the removal of powder.

SUMMARY

A first aspect relates to a method for unpacking objects produced by means of additive manufacturing and using a granular material in a job box. Once a manufacturing cycle ends, with the objects already produced, the objects are therefore unpacked or separated from the non-solidified granular material present together with said objects in the job box using the method, starting from the arrangement of said objects and said non-solidified granular material on a platform of the job box.

The platform demarcates the lower portion of the job box and comprises holes through which the non-solidified granular material is discharged from the job box by gravity. The holes are closed when the objects are being produced, and the unpacking method comprises opening said holes in a controlled manner to allow discharging through same the non-solidified granular material. The non-solidified granular material is thereby separated from the objects, and only the produced objects remain in the job box, said objects thus being unpacked.

To perform unpacking, a controlled inclination of the job box in different directions is furthermore caused with the holes of the platform of the job box open. The non-solidified granular material present in the job box is thereby shifted around and the discharge thereof from the job box through said holes is made easier. Since the inclination is controlled, it can be performed in the desired order and direction and up to a desired angle which assures that the object does not move around dangerously in the job box in order to prevent the risk of said object breaking, for example.

Furthermore, since inclination in different directions can be caused, it is easier for the non-solidified granular material present in different areas of the job box to be arranged on the holes of the platform for discharge. The unpacking of the objects is therefore achieved, or at least made easier, in a simple manner and without the risk of breaking the produced objects.

To perform the unpacking, in the method the job box is moved to an unpacking station comprising a support supported on a plurality of support areas that are movable in height. The job box is coupled to the support of the unpacking station, and the opening of the holes of the platform of the job box is caused after the coupling, the inclination of said support being caused by means of the controlled vertical movement of the support areas on which the support is supported for causing the inclination of the job box.

A second aspect relates to an unpacking system for unpacking objects produced by means of additive manufacturing and using a granular material. The system comprises a job box where the objects are manufactured and which in turn comprises a platform on which the non-solidified granular material and the objects, once they are produced, are arranged, the platform comprising holes through which the non-solidified granular material is discharged from the job box by gravity. The system also comprises actuation means suitable for opening said holes in a controlled manner for said discharge.

The system further comprises additional actuation means for causing a controlled inclination of the job box in different directions.

The system further comprises an unpacking station with a fixed structure and a support arranged on said structure with freedom of movement. The support and the job box are configured to be coupled to one another and thereby to move integrally with one another. The support comprises a cavity on which the platform of the job box is at least partially arranged to allow discharging through the cavity the non-solidified granular material falling through the holes of the platform, the support being configured to be inclined with respect to the structure.

The same advantages as those mentioned for the method are thereby achieved with the system.

These and other advantages and features will become evident in view of the drawings and detailed description.

DETAILED DESCRIPTION

The method is suitable for unpacking objects 1 produced by means of additive manufacturing and using a granular material, such as a type of sand, for example, and in a job box 100, particularly for unpacking sand cores thus produced. In this type of sand core manufacturing, sand and resin layers are alternately arranged in the job box 100. The resin to be arranged therein depends on the shape of the objects 1 to be produced, whereas the sand is usually applied regardless of said shape. As a result, the produced objects 1 (sand and resin mixture) remain in the job box 100 together with non-solidified granular material 2 (sand) that has not mixed with the resin, as depicted by way of example in FIGS. 1 and 2. The objects 1 are separated from the non-solidified granular material 2 by means of the method, said objects 1 being unpacked.

Figure 1:
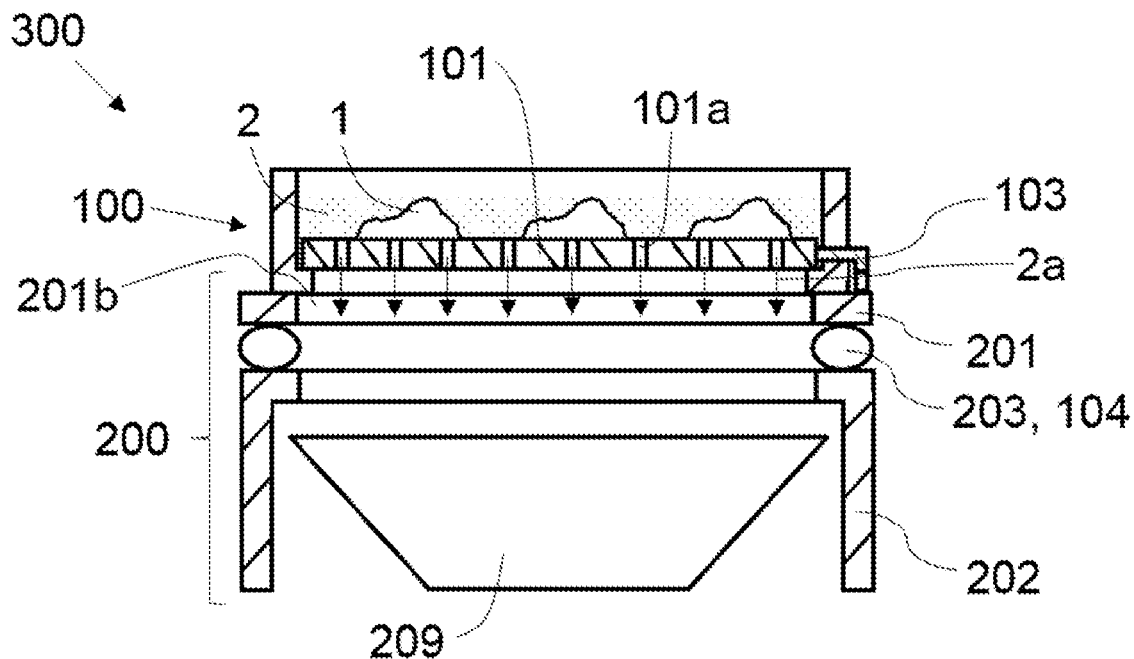
FIG. 1 schematically shows a job box of an unpacking system according to one embodiment, arranged in an unpacking station of said system.

In the job box 100, the objects 1 and the non-solidified granular material 2 are arranged on a platform 101 of the job box 100 once manufacturing ends. The platform 101 comprises a plurality of holes 101a to discharge through same the non-solidified granular material 2 from the job box 100 by gravity, as depicted with reference 2a in FIG. 1 by way of example, said holes 101a being opened in a controlled manner for said discharge as required and for thereby separating the objects 1 from the non-solidified granular material 2. The platform 101 is preferably horizontal, as shown in FIG. 1.

Figure 2:
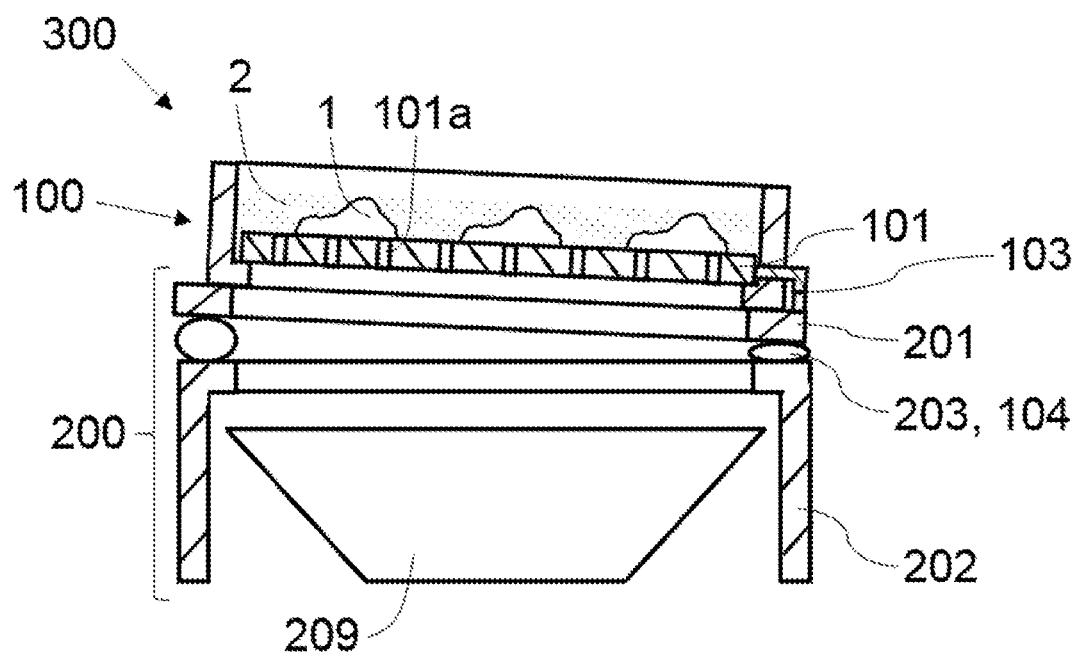
FIG. 2 schematically shows the job box of the system of FIG. 1, said job box being inclined.

To perform unpacking, a controlled inclination of the job box 100 in different directions is caused in the method, with the holes 101a of the platform 101 of the job box 100 being open, such that the non-solidified granular material 2 present in the job box 100 is shifted around and the discharge thereof through the holes 101a of the platform 101 is made easier. FIG. 2 shows by way of example an inclination of the core box 100 in a specific direction, but the method includes applying different inclinations of the job box 100.

The inclination in different directions is done by alternating one direction with another such that the non-solidified binding material 2 is shifted around at all times in all directions, and it can furthermore be done as and when it is deemed appropriate. Depending on the produced objects 1, mainly due to their shape and/or size, inclination needs can vary both in number and in directions, force and time, for example, the inclinations for each case being able to be adjusted. Therefore, in such case, a user could customize needs and even save different options for different cases such that the user can select the suitable option for each case.

To perform unpacking, once the objects 1 are produced and before opening the holes 101a of the platform 101, the job box 100 is moved to an unpacking station 200 comprising a support 201 supported on a plurality of support areas of the unpacking station 200 that are movable in height, and the job box 100 is coupled to the support 201 of the unpacking station 200. After the coupling, the opening of the holes 101a of the platform 101 of the job box 100 is caused to allow discharging the non-solidified granular material 2, the inclination of said support 201 also being caused for causing the inclination of the job box 100. This inclination is caused by means of the controlled vertical movement of the support areas on which the support 201 is supported, as required (preferably by alternating the movements of the different support areas). Each movement of a support area translates into an inclination of the support 201, and therefore an inclination of the job box 100.

In a preferred embodiment, the support 201 of the unpacking station 200 comprises a square or rectangular base, said support 201 being supported on four support areas and each support area being close to or under one of the vertexes of the support 201. This allows easily inclining the support 201 in a plurality of directions, depending on the movement of the support areas, and since the job box 100 is coupled to the support 201, said job box 100 inclines together said support 201.

In the preferred embodiment, the support 201 is furthermore arranged on a structure 202 of the unpacking station 200, and the unpacking station 200 comprises a plurality of inflatable elements 203 arranged between the structure 202 and the support 201, the support 201 therefore being supported on the inflatable elements 203. Each inflatable element 203 comprises at least one of the support areas on which the support 201 is supported, each of them preferably comprising a single support area, and the corresponding inflatable element 203 is inflated and/or deflated in a controlled manner to cause the movement of a support area, the corresponding inclination of the support 201 and therefore of the job box 100 coupled to said support 201 being caused. The different inflatable elements 203 are independently controlled although they can be inflated and/or deflated simultaneously. Two or more inflatable elements 203 can be inflated or deflated simultaneously, but this inflating or deflating is preferably done to different degrees in order to obtain different inclinations. Since they are controlled independently, desired inclinations at the desired degrees can be obtained at all times.

In the preferred embodiment, vibration of said job box 100 is furthermore caused, with the holes 101a of the platform 101 of the job box 100 being open, the required inclinations and vibration of said job box 100 being performed simultaneously if required. This makes it easier to shift the non-solidified granular material 2 around, making the discharge thereof even easier if required. Furthermore, the degree of vibration can be adjusted as needed. The inflatable elements 203 are made of rubber or an equivalent material, such that they absorb and/or dampen vibrations and prevent them from reaching the structure 202.

In the preferred embodiment, the platform 101 is formed by a plurality of parallel plates 102, preferably three in number, arranged on top of one another like a sandwich. Each plate 102 comprises a plurality of through holes 102a, and to open the holes 101a of the platform 101 the movement of at least one of said plates 102 in a transverse direction T is caused, such that the holes 102a of the different plates 102 are aligned and allow the passage of the non-solidified binding material 2 through the platform 101, as shown by way of example in FIGS. 3A and 3B. Therefore, when the holes 102a of the different plates 102 are aligned, the holes 101a are said to be open since the non-solidified granular material 2 is allowed to pass through them and out of the job box 100.

A second aspect relates to an unpacking system 300 for unpacking objects 1 produced by means of additive manufacturing and using a granular material such as a type of sand, for example, in which an unpacking method such as the one of the first aspect of the invention is implemented, for example, obtaining the same advantages as those described for said first aspect.

The system 300 comprises the job box 100 in which the objects 1 are produced, and the job box 100 comprises a platform 101 on which the non-solidified granular material 2 and the objects 1, once they are produced, are arranged. As described above, the non-solidified granular material 2 is the surplus granular material that is not part of the produced objects 1 but has been used during the manufacture thereof.

The platform 101 comprises a plurality of holes 101a through which the non-solidified granular material 2 is discharged from the job box 100 by gravity, and the system 300 comprises actuation means 103 suitable for opening said holes 101a in a controlled manner for said discharge. Said actuation means 103 can be manual, but is preferably an actuator operated by control means. The actuator can be a cylinder, for example.

The system 300 further comprises additional actuation means 104 for causing a controlled inclination of the job box 100 in different directions, as discussed above for the first aspect of the invention, and control means for controlling said inclinations.

The system 300 further comprises an unpacking station 200 in which the job box 100 is arranged for unpacking the objects 1. The unpacking station 200 comprises a fixed structure 202 and a support 201. The support 201 is arranged on the fixed structure 202 with freedom of movement, and both the support 201 and the job box 100 are configured for being able to be coupled to one another by coupling means not depicted in the drawings when the job box 100 is arranged in the unpacking station 200, said support 201 and said job box 201 thereby moving integrally with one another. The support 201 is configured to be inclined with respect to the structure 202 actuated by the additional actuation means 104, the job box 100 thus being inclined with respect to the structure 202.

The coupling means can be of the tongue and groove type, for example, and it can be manual or automatic (in the latter case, it would be automatically coupled either due to the actual configuration of the coupling means or by means of a controlled actuation thereof by control means, for example).

The support 201 comprises a cavity 201b on which the platform 101 of the job box 100 is at least partially arranged, such that when the passage of the holes 101a of said platform 101 is opened, the non-solidified granular material 2 falls through said cavity 201b going through the support 201, being able to be deposited in a container 209 arranged under the support 201 for subsequent discharge from the unpacking station 200, for example.

In a preferred embodiment, the additional actuation means 104 is pneumatic means arranged in the unpacking station 200. The additional actuation means 104 comprises a plurality of inflatable elements 203 arranged between the support 201 and the structure 202 and suitable for being inflated and deflated in an independent and controlled manner to cause the corresponding inclination.

The inflatable elements 203 are preferably arranged under the outer ends of the support 201, leaving the space under the cavity 201b of said support 201 at least partially free to allow the non-solidified granular material 2 to fall through same. The system 300 comprises actuation means not depicted in the drawings for inflating and deflating the inflatable elements 203 in a controlled manner. For example, the actuation means can comprise a three-way valve and a pressure regulator for each inflatable element 203, said valve and said regulator preferably being controlled by the control means. The pressure of the air used for inflating the corresponding inflatable element 203 is controlled with the pressure regulator, and inflating or deflating the corresponding inflatable element 203 is controlled with the three-way valve. The actuation means can be connected to a pressurized air intake, for example, said pressurized air being that used for inflating the inflatable elements 203.

The system 300 can further comprise vibration means not depicted in the drawings for causing the vibration of the job box 100. The vibration is intended for shifting the non-solidified granular material 2 present in the job box 100 around in order to make the discharge thereof through the holes 101a of the platform 101 easier. Therefore, in the preferred embodiment the system 300 comprises vibration means which is furthermore arranged in the unpacking station 200, attached to the support 201, for causing the vibration of said support 201 when required. If the job box 100 is coupled to the support 201, the vibration of the support 201 causes the vibration of the job box 100. The control means is therefore configured for causing the vibration of the support 201 when the job box 100 is coupled to said support 201, and preferably when the holes 101a of the platform 101 of the job box 100 are open. In the preferred embodiment, since the inflatable elements 203 are made of rubber, said inflatable elements 203 absorb and/or dampen the vibrations and prevent from reaching the structure 202, at least for the most part. The inflatable elements 203 can be made of another type of equivalent material, in the sense that said material reacts to vibrations in the same way or in a similar way (for absorbing and/or dampening them).

In the preferred embodiment, the support 201 comprises the actuation means 103 causing the controlled opening of the holes 101a of the platform 101 of the job box 100, the job box 100 and the platform 101 being configured such that said actuation means 103 is coupled to said platform 101 when the job box 100 is coupled to the support 201. The platform 101 comprises at least two faced plates 102, and the actuation means 103 is suitable for being coupled to one of said plates 102 and for moving said plate longitudinally with respect to the other plate 102, the holes 101a being opened or closed with said movement.

Figure 3A:
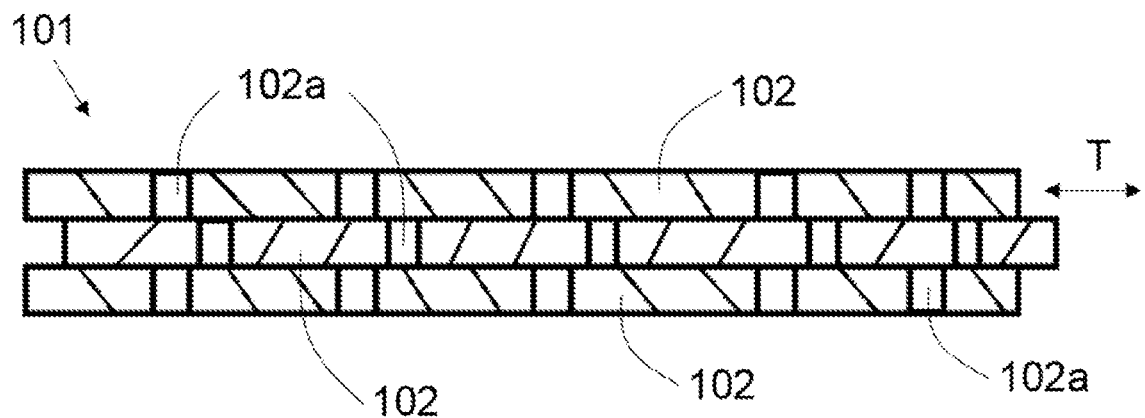
FIG. 3A shows a platform of the job box of the system of FIG. 1, with the holes of said platform being closed.
Figure 3B:
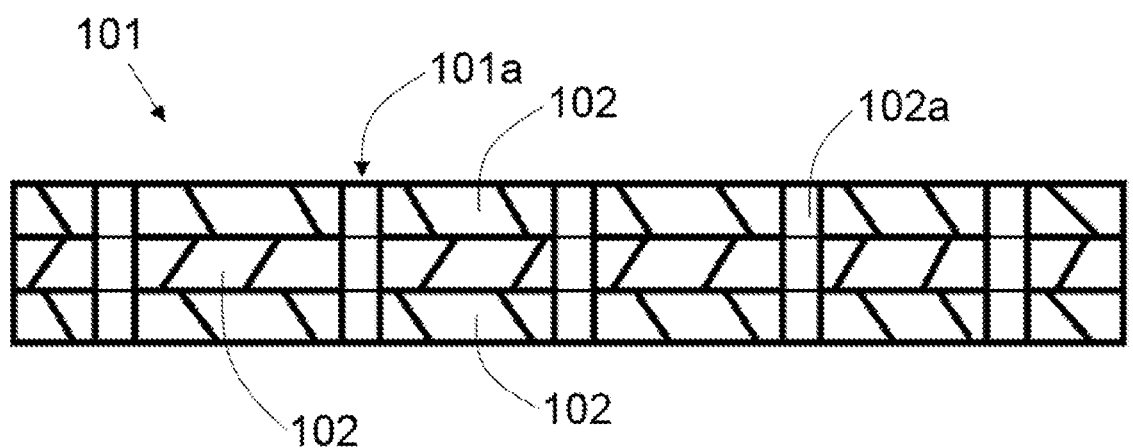
FIG. 3B shows the platform of the job box of the system of FIG. 1, with the holes of said platform being open.

In the preferred embodiment, the platform 101 comprises three plates 102, as shown in FIGS. 3A and 3B, arranged on top of one another like a sandwich, the intermediate plate 102 being the plate to which the actuation means 103 are coupled. All the plates 102 comprise through holes 102a, and the holes 101a are open when said through holes 102a coincide with one another, as shown in FIG. 3B by way of example.

Figure 4:
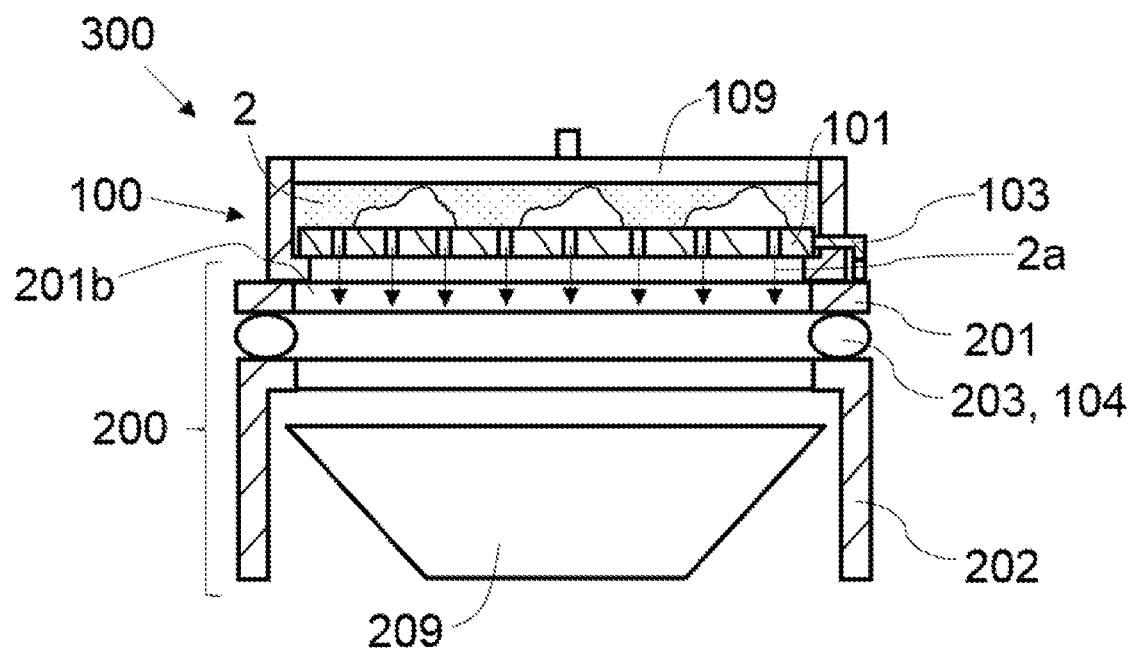
FIG. 4 shows a heating plate arranged in the system of FIG. 1.

The unpacking station 200 can further comprise a heating plate 109 suitable for being arranged on the job box 100, as shown by way of example in FIG. 4, used for heating the content of said job box 100. As a result of the heating plate 109, the objects 1 can, for example, be hardened so that they can subsequently be handled in a safer manner without the risk (or with a lower risk) of them accidentally breaking. The heating plate 109 can act during unpacking in any of its phases. If it is applied beforehand when there is non-solidified granular material 2 in the job box 10 and before and/or during vibration, the objects 1 that can subsequently withstand greater or more sudden vibrations harden. If, in contrast, it is designed or configured to act only after unpacking or in an advanced unpacking phase, the amount of non-solidified granular material 2 present in the job box 100 is less than in the preceding case (or even negligible, depending on when the heating plate 109 is activated), and less heat energy is therefore required for hardening the objects 1 since less material (non-solidified granular material 2 plus objects 1) has to be heated, a smaller dimensioning of the heating plate 109 being required.

The following clauses disclose additional embodiments.

Clause 1: A method for unpacking objects produced by means of additive manufacturing from a granular material in a job box (100), the objects (1) being unpacked from a non-solidified granular material (2) by means of the method once they are produced, starting from the arrangement of said objects (1) and said non-solidified granular material (2) on a platform (101) of the job box (100), the platform (101) comprising a plurality of holes (101a) to discharge through same the non-solidified granular material (2) from the job box (100), said holes (101a) being opened in a controlled manner for said discharge and for thereby separating the objects (1) from the non-solidified granular material (2), the objects (1) being unpacked, wherein, to perform the unpacking, a controlled inclination of the job box (100) in different directions being caused, with the holes (101a) of the platform (101) of the job box (100) being open, for shifting the non-solidified granular material (2) present in said job box (100) around and making the discharge thereof through said holes (101a) easier, to perform the unpacking, in the method the job box (100) is moved to an unpacking station (200) comprising a support (201) supported on a plurality of support areas that are movable in height, the job box (100) is coupled to the support (201) of the unpacking station (200), and the opening of the holes (101a) of the platform (101) of the job box (100) is caused after the coupling, the inclination of said support (201) being caused by means of the controlled vertical movement of the support areas on which the support (201) is supported for causing the inclination of the job box (100).

Clause 2: The method according to clause 1, wherein the support (201) of the unpacking station (200) comprises a square or rectangular base, said support (201) being supported on four support areas and each support area being arranged close to or under one of the vertexes of the support (201).

Clause 3: The method according to clause 1 or 2, wherein the support (201) is arranged on a structure (202) of the unpacking station (200), the unpacking station (200) further comprising a plurality of inflatable elements (203) arranged between the structure (202) and the support (201), and each inflatable element (203) comprising at least one of the support areas on which the support (201) is supported, each of said inflatable elements (203) being inflated and deflated in a controlled manner to cause the corresponding inclination of the support (201) and of the job box (100) coupled to the support (201).

Clause 4: The method according to clause 3, wherein the inflatable elements (203) are independently controlled, each inflatable element (203) preferably comprising a single respective support area.

Clause 5: The method according to any of the preceding clauses, wherein the vibration of said job box (100) is furthermore caused with the holes (101a) of the platform (101) of the job box (100) being open.

Clause 6: An unpacking system for unpacking objects produced by means of additive manufacturing from a granular material, comprising a job box (100) where the objects (1) are manufactured and in turn comprising a platform (101) on which a non-solidified granular material (2) and the objects (1), once they are produced, are arranged, the platform (101) comprising a plurality of holes (101a) to discharge through same the non-solidified granular material (2) from the job box (100), and the system (300) comprising actuation means (103) suitable for opening said holes (101a) in a controlled manner for said discharge, and additional actuation means (104) for causing a controlled inclination of the job box (100) in different directions, characterized in that the system (300) further comprises an unpacking station (200) with a fixed structure (202) and a support (201) arranged on said structure (202) with freedom of movement, the support (201) and the job box (100) being configured to be coupled to one another and thereby moving integrally with one another, and the support (201) comprising a cavity (201b) on which the platform (101) of the job box (100) is at least partially arranged to allow discharging through same the non-solidified granular material (2) falling through the holes (101a) of the platform (101), the support (201) being configured to be inclined with respect to the structure (202).

Clause 7: The unpacking system for unpacking objects according to clause 6, wherein the additional actuation means (104) are arranged in the unpacking station (200) and comprise a plurality of inflatable elements (203) arranged between the support (201) and the structure (202) on which the support (201) is supported, each inflatable element (203) being suitable for being inflated and deflated in a controlled manner to cause the corresponding inclination.

Clause 8: The unpacking system for unpacking objects according to clause 7, wherein the inflatable elements (203) are arranged under the outer ends of the support (201), leaving the space under the cavity (201b) of said support (201) at least partially free.

Clause 9: The unpacking system for unpacking objects according to any of clauses 6 to 8, comprising vibration means in the unpacking station (200) associated with the support (201) for causing the vibration of said support (201) and of the job box (100) coupled to said support (201).

Clause 10: The unpacking system for unpacking objects according to any of clauses 6 to 9, wherein the support (201) comprises the actuation means (103) causing the controlled opening of the holes (101a) of the platform (101) of the job box (100), the job box (100) and the platform (101) being configured such that said actuation means (103) are coupled to said platform (101) when the job box (100) is coupled to the support (201).

Clause 11: The unpacking system for unpacking objects according to clause 10, wherein the platform (101) comprises at least two plates (102) arranged on top of one another, the actuation means (103) being suitable for being coupled to one of said plates (102) and for moving said plate longitudinally with respect to the other plate (102) and each plate (102) comprising a plurality of holes (102a).

Clause 12: The unpacking system for unpacking objects according to clause 11, wherein the platform (101) comprises three plates (102) arranged on top of one another like a sandwich, the intermediate plate being the plate coupled to the actuation means (103) and the other two plates (102) comprising coinciding holes (102a).

Clause 13: The unpacking system for unpacking objects according to any of clauses 6 to 12, wherein the unpacking station (200) comprises a heating plate (109) adapted for being arranged on the job box (100) and for heating the content of said job box (100).

What is claimed is:

1. A method for unpacking one or more objects produced by means of additive manufacturing from a granular material in a job box, the job box including a platform that includes a plurality of holes, the plurality of holes being transitional between a closed position and an open position, in the closed position the non-solidified granular material cannot be discharged from the job box through the plurality of holes, in the open position the non-solidified granular material is capable of being discharged from the job box through the plurality of holes, the method comprising:
coupling the job box to a support of an unpacking station, the support being supported on a plurality of support areas that that are each movable in height;
opening the plurality of through holes to discharge the non-solidified granular material from the job box after the job box is coupled to the support of the unpacking station;
altering an inclination of the job box in different directions to shift the non-solidified granular material inside the job box while the plurality of through holes are open, the inclination being altered by changing the height of at least one of the plurality of support areas; and
wherein the unpacking station includes a fixed structure on which the support is arranged, the plurality of support areas comprising a plurality of inflatable elements arranged between the fixed structure and the support, each of the inflatable elements being inflated to increase in height and deflated to decrease in height to alter the inclination of the job box.

2. The method according to claim 1, wherein the support of the unpacking station comprises a rectangular base having first, second, third and fourth corners, the support being supported on first, second, third and fourth support areas that are respectively arranged at or near the first, second, third and fourth corners of the support.

3. The method according to claim 2, wherein the first, second, third and fourth support areas are arranged under the support.

4. The method according to claim 1, wherein each of the plurality of inflatable elements is independently inflated and deflated.

5. The method according to claim 4, wherein each of the plurality of support area comprises only one of the plurality of inflatable elements.

6. The method according to claim 1, further comprising vibrating the job box while the plurality of through holes are open.

7. The method according to claim 1, further comprising vibrating the job box while the plurality of through holes are open.

8. An unpacking system for unpacking one or more objects produced by means of additive manufacturing from a granular material, the system comprising:
a job box including a platform that is configured to support the one or more objects and non-solidified granular material, the platform including a plurality of holes, the plurality of holes being transitional between a closed position and an open position, in the closed position the non-solidified granular material cannot be discharged from the job box through the plurality of holes, in the open position the non-solidified granular material is capable of being discharged from the job box through the plurality of holes;
a first actuator configured to open and close the plurality of holes; an unpacking station including a support arranged with freedom of movement on a fixed structure, the job box being coupled to the support, the support having a through opening through which the non-solidified granular material passes when the plurality of through openings are open;
a second actuator configured to cause a controlled inclination of the support in different directions with respect to the fixed structure; and
wherein the second actuator comprises a plurality of inflatable elements arranged between the support and the fixed structure, each of the plurality of inflatable element being inflatable and deflated to cause the controlled inclination of the support in the different directions.

9. The unpacking system according to claim 8, wherein each of the plurality of inflatable elements is made of a material that absorbs vibration from the support.

10. The unpacking system according to claim 8, wherein the inflatable elements are arranged at outer ends of the support, leaving the through opening of the support open.

11. The unpacking system according to claim 8, further comprising a vibrator coupled to the support, the vibrator configured to cause the support to vibrate and also to cause the job box to vibrate by virtue of the job box being coupled to the support.

12. The unpacking system according to claim 8, further comprising a vibrator coupled to the support, the vibrator configured to cause the support to vibrate and also to cause the job box to vibrate by virtue of the job box being coupled to the support.

13. The unpacking system according to claim 8, wherein the first actuator is attached to or is a part of the support, the first actuator being coupled to the platform of the job box when the job box is coupled to the support.

14. The unpacking system according to claim 8, wherein the platform comprises at least first and second plates with the first plate arranged on vertically above the second plate, the plurality of through openings in the platform being open when a first plurality of through holes in the first plate overlap with a second plurality of through holes in the second plate.

15. The unpacking system according to claim 14, wherein the first actuator is configured to be attached to one of the first and second plates and configured to move the one of the first and second plates horizontally with respect to the other of the first or second plate.

16. The unpacking system according to claim 8, wherein the platform comprises at least first, second and third plates, the second plate being located vertically below the first plate and vertically above the third plate, first, second and third plates respectively including a first, second and third plurality of through holes, the plurality of through openings in the platform being open when the first and second plurality of through holes overlap with one another and when the second and third plurality of through openings overlap with one another.

17. The unpacking system according to claim 16, wherein the first actuator is configured to be attached to the second plate and to move the second plate horizontally with respect to the first and third plates.

18. The unpacking system according to claim 8, wherein the unpacking station further comprises a heating plate configured for placement on the job box and for heating the one or more objects when the one or more objects reside inside the job box.

\* \* \* \* \*